United States Patent [19]
Milani et al.

[11] Patent Number: 5,715,042
[45] Date of Patent: Feb. 3, 1998

[54] METHOD FOR DETERMINING THE PRECISE POSITION OF A MOBILE VEHICLE MOVING IN AN OPEN SPACE AND APPARATUS EMPLOYING SAID METHOD FOR THE VEHICLE REMOTE CONTROL

[75] Inventors: Carlo Milani, Via Case Nuove, 30—Vistarino (Pavia); Gianantonio Moretto, Novedrate, both of Italy

[73] Assignee: Carlo Milani, Italy

[21] Appl. No.: 549,855

[22] PCT Filed: May 24, 1994

[86] PCT No.: PCT/IT94/00067

§ 371 Date: Nov. 17, 1995

§ 102(e) Date: Nov. 17, 1995

[87] PCT Pub. No.: WO94/28436

PCT Pub. Date: Dec. 8, 1994

[30] Foreign Application Priority Data

May 25, 1993 [IT] Italy ................. PV93A0005

[51] Int. Cl.$^6$ .................. G01C 3/00; G01S 3/02
[52] U.S. Cl. ............... 356/3.12; 356/141.3; 342/450
[58] Field of Search ....................... 356/3.1, 3.12, 356/141.3; 342/386, 398, 450, 456, 464

[56] References Cited

U.S. PATENT DOCUMENTS 3,818,478  6/1974  Groginsky ............... 343/108 M
4,007,991  2/1977  Robertson ............... 356/141
4,564,841  1/1986  Neidell ............... 343/386

Primary Examiner—Mark Hellner
Attorney, Agent, or Firm—Londa and Traub LLP

[57] ABSTRACT

Method and apparatus for determining the position of a mobile vehicle with a receiver, through a triangulation based on angular data obtained by processing directive electromagnetic signals emitted by fixed rotating transmitters. The method includes: dividing the 360° of the rotation into $2^n$ angular values; generating a coding sequence of $2^n$ binary configurations made up of $2^n+(n-1)$ bits; generating a coding pattern wherein said angular values are coded; storing said coding pattern in the transmitters and in the receiver; starting the rotations of the two transmitters at a correlated, constant speed; transmitting the angular data corresponding to the direction of emission of the beams; demodulating the signals detected by the receiver and obtaining the coded angular values; and calculating the vehicle position by using the latest mean angular values obtained from the signals. The apparatus employing said method for the remote control of a vehicle includes a plurality of processing units and interfaces to perform the driving and control functions, and a transceiver communication system connected to said driving and control system made of a pair of transceivers coupled to a modem.

3 Claims, 1 Drawing Sheet

METHOD FOR DETERMINING THE PRECISE POSITION OF A MOBILE VEHICLE MOVING IN AN OPEN SPACE AND APPARATUS EMPLOYING SAID METHOD FOR THE VEHICLE REMOTE CONTROL

This invention concerns methods and apparatuses for determining the position of a mobile vehicle and for the vehicle remote control, in particular a method suitable to be applied in open spaces free from obstacles and capable of a very high precision over distances up to thousands of meters.

BACKGROUND OF THE INVENTION

It is known that plenty of methods and relevant apparatuses have been devised for determining the precise position of a mobile vehicle so that it can be remotely controlled in order to avoid the use of human drivers for cost and/or safety reasons. The common basic feature of most of these methods is the use of one or more transmitters of directive electromagnetic waves which are detected by one or more receivers. The emission angle can be contained as an information in the transmission itself or it can be obtained from the time/angular velocity relationship of the rotating transmitter. The angular data thus acquired are then electronically processed to obtain the vehicle position through quick plane trigonometry calculations, i.e. a triangulation.

The drawback of the known methods stems from the insufficient precision in determining the exact angle of emission of the electromagnetic waves, which in turn leads to an insufficient precision in obtaining the vehicle position. In fact, the precision achieved is not sufficient for a safe and precise remote control of vehicles over distances ranging from tens to thousands of meters. In particular, the highest precision is obtained by transmitting two or more directional beams to a receiver positioned on the vehicle, each beam containing the continuously changing information of its direction of emission.

Obviously, the precision of the position calculated from these angular data is directly proportional to the "resolution" thereof, i.e. to the frequency with which the information on the direction of emission is upgraded. For example, if the angular resolution ($\epsilon$) is as rough as 1° the resulting calculated position can not be acceptably precise. On the other hand, employing a very fine resolution (e.g. $\epsilon=0.001°$) requires so many data to be transmitted that the resulting transmission would imply such a high frequency as to require very sophisticated, delicate and expensive transmitters. Moreover, this type of signal is more easily subject to interference problems.

Therefore, the object of the present invention is to provide a method and apparatus capable of overcoming the above-mentioned drawbacks.

SUMMARY OF THE INVENTION

This object is achieved by means of a method method for determining the position of a mobile vehicle provided with a receiver through a triangulation performed by the receiver. The determination is based on angular data obtained by processing modulated directive electromagnetic signals emitted by at least two fixed rotating transmitters, and includes the operative steps of: dividing the 360° of the rotation into $2^n$ angular values, n being an integer; generating a coding sequence of $2^n$ binary configurations of n bits successively overlapping for n−1 bits, whereby the n bits of each of the $2^n$ configurations in the sequence are the n−1 last bits of the preceding configuration plus one more bit, the coding sequence being made up of $2^n+(n-1)$ bits; generating a coding pattern wherein said angular values are coded by successively assigning to each of them one of the $2^n$ binary values corresponding to the successive $2^n$ configurations of n bits making up said coding sequence; storing the coding pattern in the transmitters and in the receiver; starting the rotations of the at least two transmitters at a constant speed and correlated so as to avoid the receiver from being swept simultaneously by both directive transmissions emitted by the transmitters; transmitting the angular data corresponding to the direction of emission of the beams by reading the coding sequence 1 bit at a time after the first n bits, the carrier wave signal being modulated according to the reading; demodulating the signals detected by the receiver and obtaining the coded angular values by adding the latest bit received from each transmitter to the n−1 last bits previously received from said transmitter; and calculating the vehicle position through a triangulation by using the latest mean angular values obtained from the signals. An apparatus according to the invention employs the method for the remote control of a vehicle, and includes at least two fixed rotating transmitters emitting modulated directive electromagnetic signals and a receiver mounted on the vehicle. Further, the apparatus is provided with a 360° signal detector, a demodulator and a processing unit, and includes storage means, suitable to retain the coding patterns, as part of the transmitters and of the receiver and a plurality of processing units and interfaces mounted on the vehicle and suitable to perform the driving and control functions thereof as well as a transceiver communication system connected to the driving and control system and made up of a pair of transceivers coupled to a modem, one of the transceivers making part of an operator-controlled ground station.

The apparent advantage of the present method and apparatus is that a very high precision is achieved, amply sufficient for the vehicle remote control over considerable distances, yet without posing excessive requirements on the transmission and processing systems of the apparatus. This results in a cheaper, lighter and more reliable apparatus which can be easily made portable since it does not require an extreme care in the handling thereof.

These and other advantages and characteristics of the method and apparatus according to the present invention will be apparent to those skilled in the art from the following detailed description of a preferred embodiment thereof, intended as a non-limiting example, referring to the annexed drawing (FIG. 1) schematically showing the parameters utilized in the position calculation.

DESCRIPTION OF THE PREFERRED EMBODIMENT

Figure 1:
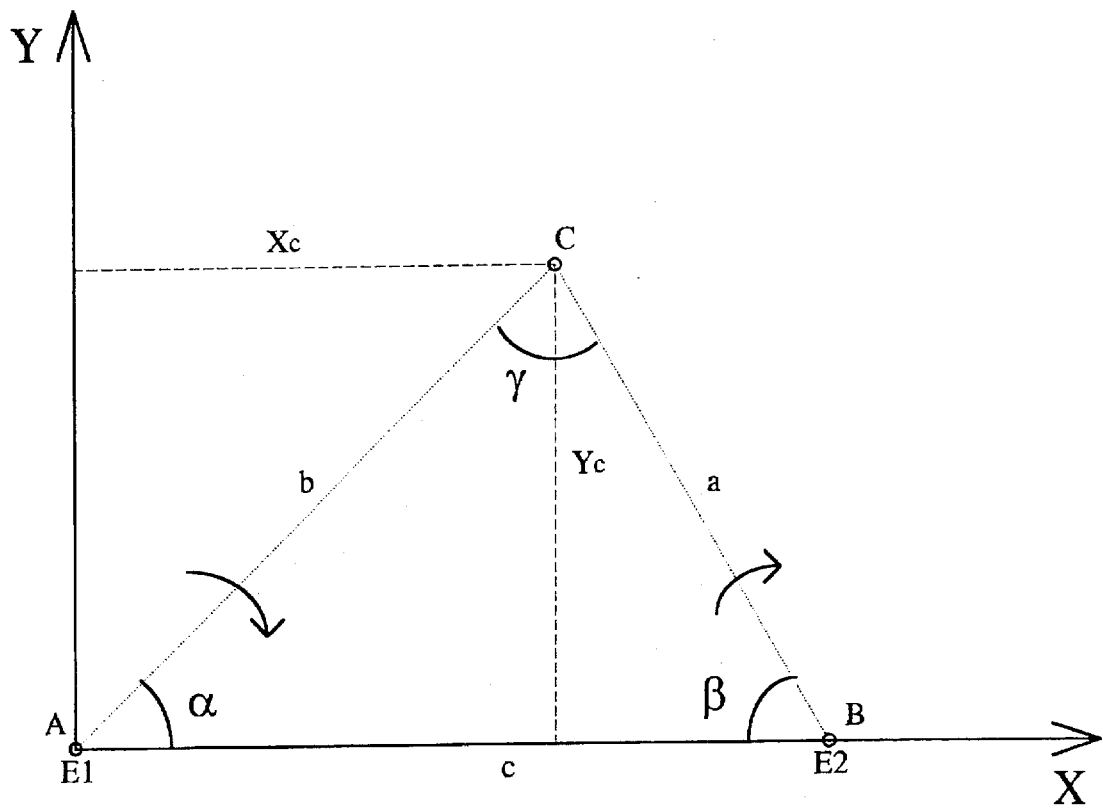
FIG. 1 is a graphical representation of the method of the invention.

Referring to said drawing, there is seen that the method according to the present invention includes the emission of two directive electromagnetic beams by two rotating transmitters E1 and E2, said beams being periodically detected by a 360° detector positioned on the mobile vehicle. The rotations of E1 and E2 (e.g. clockwise) are at a constant speed and correlated so as to avoid the receiver from being "illuminated" simultaneously by both beams.

The two transmitters E1, E2 and the receiver are the vertices A, B and C, respectively, of a triangle whose inner angles are α, β and γ, respectively, and the sides opposite to said angles are a, b and c, respectively. The beam transmitted by E1 carries a continuously changing code indicating the value of the α angle, and similarly the beam transmitted by E2 carries the value of the β angle.

Actually, the information transmitted are not the values of the α and β angles shown in FIG. 1, but the angle of emission with respect to an arbitrary reference direction from which the α and β angles are easily calculated. Considered that the vehicle operates, for example, in the area defined by vertex C being included between vertices A and B and above them (α and β<90°), taking the Y-axis, for example, as 0° the value transmitted by E1 is 90°−α and the value transmitted by E2 is 270°+β. Therefore, it is clear that the information transmitted need not contain also the "name" of the source since the receiver knows that values ranging from 0° to 90° come from E1 and values ranging from 270° to 360° come from E2, according to the example above.

The fixed distance between the transmitters, i.e. the length of side c, is previously precisely measured in any suitable way, and it will be referred to hereinafter as the "base". Since the base and the two angles α and β adjacent thereto are known, all the other elements of the triangle are easily obtained, as well as the receiver Cartesian coordinates $X_c$, $Y_c$ in a frame of reference wherein A is in the origin and B on the X-axis.

Clearly, the base can be positioned in any way with respect to the operation area, even diagonally or in the middle thereof, and a same pair of transmitters can be used for the positioning of various vehicles operating in the different quadrants with respect to the base taken into consideration.

The value code is transmitted by modulating the carrier wave of the electromagnetic transmission which is preferably a beam of laser light, but could also consist in microwaves or other types of waves, provided that they are sufficiently directive.

The coding of the angle value is performed through a binary n-bits code by generating a sequence of $2^n$ binary configurations of n bits. However, the use of $2^n$ independent codes each one including n bits (plus n' error check bits, etc.) implies the transmission of $(n+n')*2^n/t$ bits per second, where t is the period of rotation of the transmitter which is usually not greater than 1 second and preferably equal to 0.5 seconds or less. For example, taking t=0.5, n=18 (corresponding to an angular resolution of about 0.0014°) and n'=4, the resulting modulating frequency exceeds 11.5 MHz.

In order to reduce the modulating frequency without affecting the angular resolution, the Applicant devised the method according to the present invention in which the sequence of the $2^n$ binary configurations of n bits is made up of codes successively "overlapping" for n−1 bits. This means that the n bits of each of the $2^n$ configurations in the sequence are the n−1 last bits of the preceding configuration plus 1 more bit. In practice, the coding sequence instead of consisting in $n*2^n$ bits read as $2^n$ codes of n bits each, is made up of $2^n+(n-1)$ bits only which are still read as $2^n$ codes of n bits but each code overlaps the following one for the first n−1 bits of the latter. In this way, the reading is performed by shifting along the sequence by 1 bit at a time instead of n bits at a time. Moreover, no error check bits are needed because the additional bit transmitted (just 1 or 0) is used, in practice, as a "clock signal" to scan the coding sequence. In case of interferences causing errors in the angular value received, the receiver automatically discards the values not compatible with the previously calculated position and the vehicle speed. Therefore, the frequency modulation required is 1/(n+n') of that required with independent configurations, i.e. just 0.5 MHz instead of 11.5 MHz, referring to the above-cited example. Since the cost and the delicacy of the laser modulators are proportional to the frequency they reach, it is clear that such a method allows a considerable saving and a significant increase in reliability. The following example will make the present method still clearer.

EXAMPLE 1

The 360° of the rotation are divided into $2^3=8$ parts only (n=3) so that the angular resolution is equal to 360°/8=45°. The corresponding coding sequence is 0001011100 (8+3−1=10 bits) and it is read as follows:

| reading | code read | binary value | coded value |
|---|---|---|---|
| 1st | 000 | 0 | 0° |
| 2nd | 001 | 1 | 45° |
| 3rd | 010 | 2 | 90° |
| 4th | 101 | 5 | 135° |
| 5th | 011 | 3 | 180° |
| 6th | 111 | 7 | 225° |
| 7th | 110 | 6 | 270° |
| 8th | 100 | 4 | 315° |

It is apparent from the above example that each transmitter E1, E2 must modulate just 1 bit at a time (after the 1st reading) since the receiver uses the 2 preceding bits in the sequence to obtain the complete 3-bits code containing the binary value corresponding to the coded value. Obviously, the transmitters and the receiver are provided with the same coding pattern, which is used by the modulator in the transmitters and by the demodulator in the receiver.

In practice, a plurality of coding patterns may be provided corresponding to increasing values of n so as to use the most suitable angular resolution for each application of the present method. In fact, the modulating capacities of the relevant apparatus may be differently allocated according, for example, to the speed of the vehicle to be remotely controlled. While the control with a very high precision of slowly moving vehicles implies higher values of n and t (more precise but less frequent position calculation), the control of vehicles moving faster but not requiring great precision implies lower values of n and t (less precise but more frequent position calculation), yet maintaining in both instances the modulating frequency $2^n/t$ within the limits of the apparatus. Since the directive beam emitted by E1, E2 has a finite width in the horizontal plane (e.g. 1 minute), it will sweep the receiver detector for a finite time during which, in general, a plurality of coded angular values will be transmitted thereto. Obviously, the actual value utilized in the position calculation will be the mean value.

It is also possible to take into account the presence of a time lag between the two beams from E1 and E2 successively sweeping the detector, which lag makes the first angle value obtained slightly change while the receiver waits for the value of the second angle. This error is usually negligible since other factors (resolution, noise, oscillations of the vehicle, etc.) generate greater errors, but it can be reduced or even substantially eliminated by either minimizing the time lag or by introducing a correction on the base of the known time lag.

The mathematical treatment, omitted for simplicity, of error E calculated as a percentage on the real coordinates shows that the maximum error at a fixed distance from the base occurs for α=β (i.e. on the centre line of the base) and said maximum error is smallest for α=β=45° and rises more slowly moving nearer to the base than moving farther therefrom. It is obvious that the error absolute value is directly proportional to the distance, and that both the absolute and per cent error are directly proportional to ε. The following table shows the per cent values of the maximum error E on X or Y, whichever is greatest, occurring in the most unfavourable condition (α=β) for four increasing values of ε (respectively corresponding to 1, 5, 10 and 60 seconds).

TABLE 1

| α = β | ε = 0.00028° | ε = 0.00139° | ε = 0.00278° | ε = 0.01666° |
|---|---|---|---|---|
| 1° | 0.028 | 0.139 | 0.278 | 1.653 |
| 2° | 0.014 | 0.069 | 0.139 | 0.827 |
| 4° | 0.007 | 0.035 | 0.069 | 0.415 |
| 6° | 0.004 | 0.024 | 0.047 | 0.280 |
| 8° | 0.003 | 0.017 | 0.035 | 0.209 |
| 10° | 0.003 | 0.014 | 0.028 | 0.170 |
| 15° | 0.002 | 0.010 | 0.020 | 0.116 |
| 25° | 0.001 | 0.006 | 0.013 | 0.076 |
| 35° | 0.001 | 0.005 | 0.010 | 0.062 |
| 45° | 0.001 | 0.005 | 0.010 | 0.058 |
| 55° | 0.002 | 0.007 | 0.015 | 0.088 |
| 65° | 0.003 | 0.014 | 0.027 | 0.163 |
| 75° | 0.007 | 0.036 | 0.072 | 0.434 |
| 80° | 0.016 | 0.080 | 0.160 | 0.965 |

The comparison between the four columns shows that a substantially linear relationship exists between ε and E. In particular, the second and third column corresponding to n=18 and n=17, respectively, show that a 1-bit reduction of the angular resolution causes a nearly exact doubling of the error. The following examples illustrate two possible applications of the present method.

EXAMPLE 2

A tyred lifting truck moving pallets over an asphalted area of 100x100 meters requires a ±5 cm precision. Since the ground vibrational disturbances are very small, a fixed installation of the two transmitters allows for a high mechanical precision. At the maximum distance of 100 m from the base along the center line thereof the angle is α=β=63.4° and corresponds to E=0.025% for ε=0.00278°, i.e. an absolute error of ±2.5 cm on the $Y_c$ coordinate (100 m) and ±1.25 cm on the $X_c$ coordinate (50 m). When the truck moves closer to the base along the center line, E decreases at first until α=β=45° and then slowly rises.

The smallest angle at which the ±5 cm precision is still achievable is α=β=3.1° when E=0.1% corresponds to ±5 cm on the $X_c$ coordinate (50 m), while the $Y_c$ coordinate is now equal to 50*tan(3.1°)=2.71 m and therefore the corresponding absolute error is ±0.27 cm. This means that the required precision can not be obtained at a distance shorter than 2.71 m from the base (for ε=0.00278°).

This problem can be solved either by increasing the resolution (lower ε) or simply by moving back the base (i.e. the transmitters E1, E2) 2.71 m from the lower edge of the operation area, so that the $Y_c$ coordinate range is 2.71–102.71 m (instead of 0–100 m) and α=β never decreases below 3.1°. These two solutions may also be combined in order to reduce the required distance of the base from the operation area edge. For example, by reducing ε to 0.00139° the 0.1% limit is reached at α=β=1.6° corresponding to a minimum distance of 1.40 m from the base.

EXAMPLE 3

A farm tractor moving over a field of 1500x1200 meters, the base being on the shortest side, requires a ±50 cm precision. Since the ground vibrational disturbances are not small, a portable installation of the two transmitters is preferable.

With the same resolution of example 2 at the maximum distance of 1500 m from the base along the center line thereof the absolute error is now ±37.5 cm on the $Y_c$ coordinate (1500 m) and ±15 cm on the $X_c$ coordinate (600 m). The smallest angle at which the ±50 cm precision is still achievable is α=β=3.6° when E=0.083% corresponds to ±50 cm on the $X_c$ coordinate (600 m), while the $Y_c$ coordinate (i.e. the minimum distance from the base) is now equal to 37.75 m and therefore the corresponding absolute error is ±3.13 cm. By reducing ε to 0.00139° the 0.083% limit is reached at α=β=1.8° corresponding to a minimum distance of 18.86 m from the base.

It should be noted that a portable installation obviously assures a precision not as high as a fixed installation, while the distance of the base from the operation area edge is usually not a problem in the fields. Therefore, the higher resolution used in this example is intended to illustrate the capacities of the present method but is quite theoretical. A more realistic application to a farm tractor would imply the use of ε=0.01666°, which would not be sufficient to reach the required ±50 cm precision. A simple solution to this problem is to place a third transmitter along the longer side of the field in order to have two bases. The distance of the vehicle will thus be considered with respect to the nearer base, so as to remain within the limits of the required precision.

The apparatus employing the above-illustrated method for the remote control of the vehicle will now be schematically described. It is substantially made up of three systems:
- vehicle tracking system (VTS)
- driving and control system (DCS)
- transceiver communication system (TCS)

The VTS is the portion of the apparatus actually embodying the method according to the present invention. As mentioned above, it includes a pair of transmitters E1, E2 emitting directive electromagnetic waves, preferably laser beams. The carrier wave is modulated by a modulator in order to contain a binary code produced by a coder as explained before. The transmitters are usually mounted on stands or the like at 2–3 m above the ground, and they rotate at a constant speed in a plane parallel to the surface on which the mobile vehicle operates.

In order to double the frequency of the position calculation without doubling the transmission frequency required, the laser modulator included in the transmitters may be of the double-exit type, i.e. the laser beam is simultaneously emitted in two opposite directions, for example the α and α+180° directions, by means of a mirror device. Since the transmitted value is α in both directions, the beam emitted along α+180° will be slightly modified so that the receiver can distinguish it and add 180° to its value for the correct calculation.

The receiver is obviously mounted on top of the vehicle and includes a 360° detector so as to detect the transmissions from E1 and E2 regardless of the orientation of the vehicle. In order to do so, the detector may also be made up of a plurality of detectors (e.g. 4 detectors covering 90° each) electrically coupled to form a 360° detector. The receiver also includes a demodulator to demodulate the transmissions, a decoder to obtain the coded values from the binary values, and a processing unit to perform the triangulation.

The position calculated by the VTS is transmitted to the DCS which includes a plurality of processing units and interfaces for performing the following functions:

- direction of motion control (steering wheel)
- speed and gear control (accelerator, gears)
- engine power and rpm check
- accelerations and main axes attitude check
- power take-offs control/check
- hydraulic circuits take-offs control/check
- rear/central/front lifters control/check Each function is specifically controlled via software according to the operations to be performed. The operating software contains the intervention priorities for allocating the processing capacities of the DCS, so that a proper quick stopping and/or correcting action can be taken upon occurrence of any specific event. Typical examples of events requiring a quick intervention are another vehicle or a person crossing the path a short distance ahead of the vehicle, or a fixed underground obstacle (e.g. a root) blocking the vehicle. The DCS must therefore operate in real-time mode with "interrupt" features, and includes a plurality of sensors for gathering the data on pressure, temperature, speed, etc. required to perform the checks and controls, as well as TV cameras, image processors, infrared or proximity sensors and the like to recognize objects, edge posts, etc.

The route to be followed by the vehicle is defined prior to the beginning of the work by putting together the perimeter of the operation area. This can be done either through conventional measuring by means of other separate instruments, or by having the vehicle, driven by an operator, travel along the perimeter with the VTS in "acquisition" mode. Once the perimeter has been acquired, the DCS calculates the trajectories according to the programmed operations to be performed.

The DCS is connected through a serial line to the TCS, which is capable of transmitting and receiving messages to and from an operator. This link between the DCS and the TCS allows the former to transmit an alarm signal in case it is unable to cope with a particular situation. By checking the DCS status, the operator can understand the nature of the problem and transmit the proper controls to resume the vehicle operations, or at least he can intervene to stop the vehicle if something goes wrong in the DCS.

The TCS also allows the recording of all the data concerning the operations performed and the anomalies occurred. It is substantially made up of a pair of transceivers coupled to a modem, so as to transmit and receive digitalized messages, one of said transceivers making part of an operator-controlled ground station. The use of frequencies in the VHF, UHF and SHF bands allows for a range of some kilometers even with little power.

What is claimed is:

1. A method for determining the position of a mobile vehicle provided with a receiver through a triangulation performed by said receiver on the base of the angular data obtained by processing the modulated directive electromagnetic signals emitted by at least two fixed rotating transmitters (E1, E2), characterized in that it includes the following operative steps:

- dividing the 360° of the rotation into $2^n$ angular values, n being an integer;
- generating a coding sequence of $2^n$ binary configurations of n bits successively overlapping for n−1 bits, whereby the n bits of each of the $2^n$ configurations in the sequence are the n−1 last bits of the preceding configuration plus one more bit, the coding sequence being made up of $2n+(n-1)$ bits;
- generating a coding pattern wherein said angular values are coded by successively assigning to each of them one of the $2^n$ binary values corresponding to the successive $2^n$ configurations of n bits making up said coding sequence;
- storing said coding pattern in the transmitters (E1, E2) and in the receiver;
- starting the rotations of the two transmitters (E1, E2) at a constant speed and correlated so, as to avoid the receiver from being swept simultaneously by both directive transmissions emitted by the two transmitters;
- transmitting the angular data corresponding to the direction of emission of the beams by reading the coding sequence 1 bit at a time after the first n bits, the carrier wave signal being modulated according to said reading;
- demodulating the signals detected by the receiver and obtaining the coded angular values by adding the latest bit received from each transmitter (E1, E2) to the n−1 last bits previously received from said transmitter; and
- calculating the vehicle position through a triangulation by using the latest mean angular values obtained from said signals.

2. An apparatus employing the method according to claim 1 for the remote control of a vehicle, including at least two fixed rotating transmitters (E1, E2) emitting modulated directive electromagnetic signals and a receiver mounted on the vehicle and provided with a 360° signal detector, a demodulator and a processing unit, characterized in that said apparatus further includes storage means making part of the transmitters (E1, E2) and of the receiver and suitable to retain the coding patterns, a plurality of processing units and interfaces mounted on the vehicle and suitable to perform the driving and control functions thereof as well as a transceiver communication system connected to said driving and control system and made up of a pair of transceivers coupled to a modem, one of said transceivers making part of an operator-controlled ground station.

3. An apparatus according to claim 2, characterized in that laser beams are utilized as directive electromagnetic signals, and in that the laser modulators included in the transmitters (E1, E2) are of the double-exit type, whereby the laser beam simultaneously emitted in two opposite directions, the beam emitted in one direction being slightly modified so that the receiver can distinguish it from the other beam.

* * * * *